(12) United States Patent
Benhase et al.

(10) Patent No.: US 9,176,884 B2
(45) Date of Patent: *Nov. 3, 2015

(54) PROMOTION OF PARTIAL DATA SEGMENTS IN FLASH CACHE

(71) Applicant: INTERNATIONAL BUSINESS MACHINES CORPORATION, Armonk, NY (US)

(72) Inventors: Michael T. Benhase, Tucson, AZ (US); Stephen L. Blinick, Tucson, AZ (US); Evangelos S. Eleftheriou, Rueschlikon (CH); Lokesh M. Gupta, Tucson, AZ (US); Robert Haas, Adliswil (CH); Xiao-Yu Hu, Horgen (CH); Matthew J. Kalos, Tucson, AZ (US); Ioannis Koltsidas, Zurich (CH); Karl A. Nielsen, Tucson, AZ (US); Roman A. Pletka, Uster (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/565,774

(22) Filed: Dec. 10, 2014

(65) Prior Publication Data

US 2015/0095561 A1 Apr. 2, 2015

Related U.S. Application Data

(63) Continuation of application No. 13/830,407, filed on Mar. 14, 2013, now Pat. No. 8,935,462, which is a continuation of application No. 13/286,465, filed on Nov. 1, 2011, now Pat. No. 8,688,914.

(51) Int. Cl.
*G06F 12/00* (2006.01)
*G06F 12/08* (2006.01)
*G06F 12/12* (2006.01)
*G06F 12/02* (2006.01)

(52) U.S. Cl.
CPC ........ *G06F 12/0871* (2013.01); *G06F 12/0246* (2013.01); *G06F 12/0253* (2013.01); *G06F 12/0811* (2013.01); *G06F 12/0864* (2013.01); *G06F 12/122* (2013.01); *G06F 12/127* (2013.01); *G06F 12/128* (2013.01); *G06F 12/0862* (2013.01); *G06F 12/0897* (2013.01); *G06F 2212/1016* (2013.01); *G06F 2212/222* (2013.01); *G06F 2212/283* (2013.01); *G06F 2212/702* (2013.01); *G06F 2212/7201* (2013.01)

(58) Field of Classification Search
CPC ............ G06F 12/0864; G06F 12/0862; G06F 12/0866
See application file for complete search history.

(56) References Cited

U.S. PATENT DOCUMENTS

| | | | |
|---|---|---|---|
| 7,930,422 | B2 | 4/2011 | Freimuth et al. |
| 2003/0233523 | A1 | 12/2003 | Jamil et al. |
| 2005/0125592 | A1 | 6/2005 | Sawdey |
| 2006/0069843 | A1 | 3/2006 | Emma et al. |
| 2006/0248547 | A1 | 11/2006 | Bockhold et al. |
| 2008/0091875 | A1 | 4/2008 | Mannenbach et al. |
| 2008/0215816 | A1 | 9/2008 | Emma et al. |
| 2011/0087837 | A1 | 4/2011 | Blinick et al. |
| 2011/0173395 | A1 | 7/2011 | Bhattacharjee et al. |

*Primary Examiner* — Cheng-Yuan Tseng
*Assistant Examiner* — Arvind Talukdar
(74) *Attorney, Agent, or Firm* — Griffiths & Seaton PLLC

(57) ABSTRACT

For efficient track destage in secondary storage in a more effective manner, for temporal bits employed with sequential bits for controlling the timing for destaging the track in a primary storage, a preference of movement to lower speed cache level is implemented based on at least one of an amount of holes and a data heat metric. If a first bit has at least one of a lower amount of holes and a hotter data heat metric, it is moved to the lower speed cache level ahead of a second bit that has at least one of a higher amount of holes and a cooler data heat. If the first bit has a hotter data heat and greater than a predetermined number of holes, the first bit is discarded.

24 Claims, 7 Drawing Sheets

PROMOTION OF PARTIAL DATA SEGMENTS IN FLASH CACHE

CROSS REFERENCE TO RELATED APPLICATIONS

This application is a Continuation of U.S. patent application Ser. No. 13/830,407, filed on Mar. 14, 2013, which is a Continuation of U.S. patent application Ser. No. 13/286,465, filed on Nov. 1, 2011, now U.S. Pat. No. 8,688,914.

BACKGROUND OF THE INVENTION

1. Field of the Invention

The present invention relates generally to computers, and more particularly, to mechanisms for promoting partial data segments in a computing storage environment.

2. Description of the Related Art

In today's society, computer systems are commonplace. Computer systems may be In the field of computing, a "cache" typically refers to a small, fast memory or storage device used to store data or instructions that were accessed recently, are accessed frequently, or are likely to be accessed in the future. Reading from or writing to a cache is typically cheaper (in terms of access time and/or resource utilization) than accessing other memory or storage devices. Once data is stored in cache, it can be accessed in cache instead of re-fetching and/or re-computing the data, saving both time and resources.

SUMMARY OF THE DESCRIBED EMBODIMENTS

Caches may be provided as multi-level caches. For example, a caching system may include both a "primary" and "secondary" cache. When reading data, a computing system or device may first look for data in the primary cache and, if the data is absent, look for the data in the secondary cache. If the data is not in either cache, the computing system or device may retrieve the data from disk drives or other storage devices. When writing data, a computing system or device may write data to the primary cache. This data may eventually be destaged to the secondary cache or a storage device to make room in the primary cache.

In data processing systems having multi-level caches, writing so-called "partial tracks," or data segments that are not completely full, to a secondary cache may present challenges. For example, storage space on the secondary cache may be wasted. In a secondary cache implemented as flash memory, or Flash Cache, the memory typically is expensive to implement and wasting memory space may consume scarce resources. In addition, returning to the disk drives or other primary storage to gather the additional data to fill the "holes" in the partial tracks may incur additional input/output (I/O) activity, also consuming resources and potentially slowing performance.

In view of the foregoing, a need exists for efficient promotion of partial data segments to secondary cache. Accordingly, and in view of the foregoing, various exemplary method, system, and computer program product embodiments for promoting partial data segments in a computing storage environment having lower and higher speed levels of cache are provided. In one such embodiment, by way of example only, a data moving mechanism is configured. The mechanism is adapted for performing implementing a preference for movement of the partial data segments to the lower speed cache level based on at least one of an amount of holes and a data heat metric, where a first of the partial data segments having at least one of a lower amount of holes and a hotter data heat metric is moved to the lower speed cache level ahead of a second of the partial data segments having at least one of a higher amount of holes and a cooler data heat, and if the first of the partial data segments has a hotter data heat and greater than a predetermined number of holes, the first of the partial data segments is discarded.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF CERTAIN EMBODIMENTS

For the purposes of this disclosure, the phrase "secondary cache" is used to refer to any cache (including, for example, L2 or L3 cache) that resides between a primary cache and a storage device, such as a disk drive, tape drive, or the like.

Figure 1:
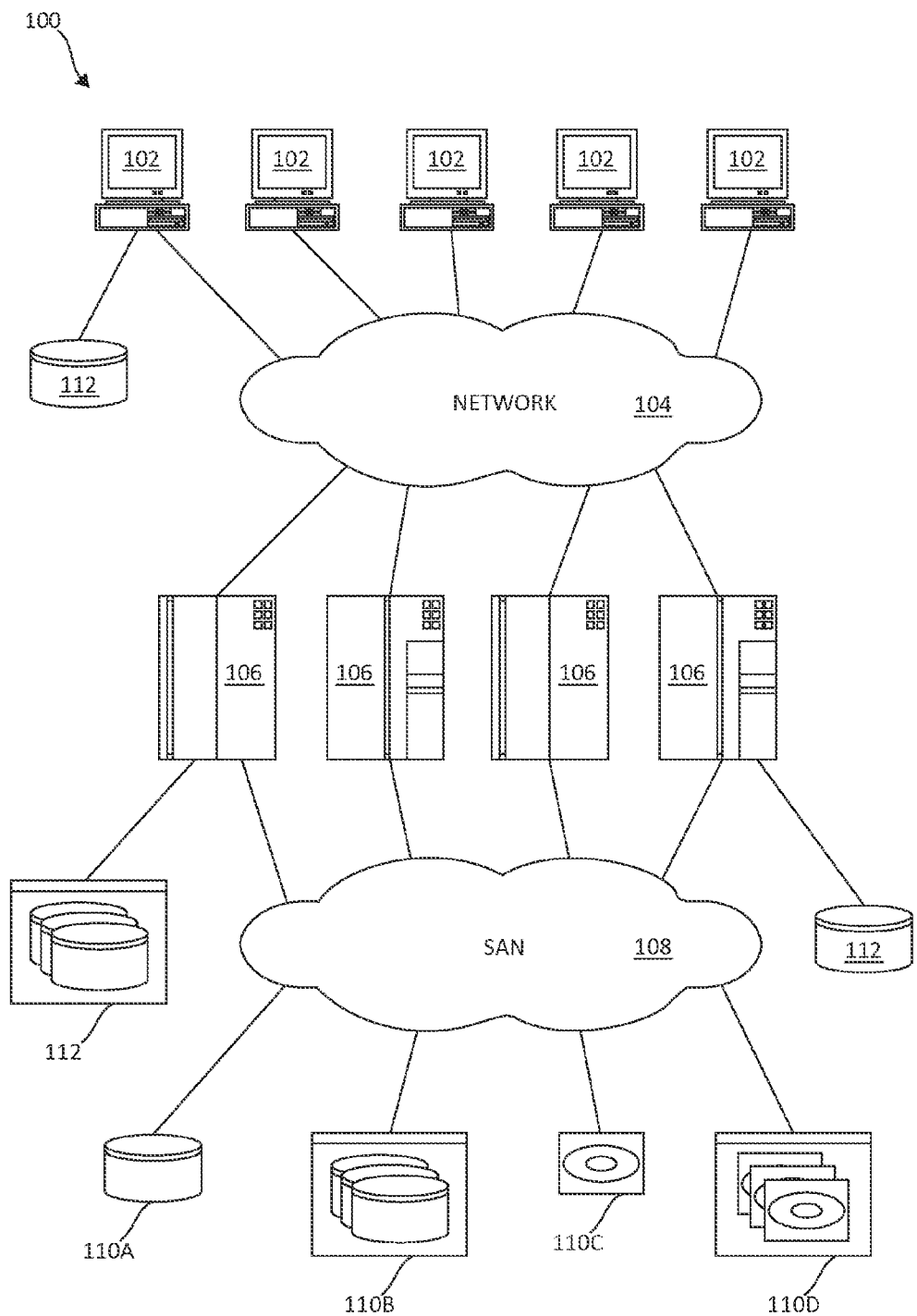
FIG. 1 is a high-level block diagram showing one example of a network and computing environment where an apparatus and method in accordance with the invention may be implemented.

Referring to FIG. 1, one embodiment of computer-network architecture 100 is illustrated. The architecture 100 is presented to show various scenarios for implementing the caching system illustrated herein. The architecture 100 is presented only by way of example and is not intended to be limiting. Indeed, the caching system disclosed herein may be applicable to a wide variety of different computers, servers, storage systems, and network architectures, in addition to the network architecture 100 shown.

As shown, the computer-network architecture 100 may include one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106. In general, client computers 102 may initiate communication sessions, whereas server computers 106 may wait for requests from the client computers 102. In certain embodiments, the computers 102 and/or servers 106 may connect to one or more internal or external direct-attached storage systems 112 (e.g. hard disk drives, solid-state drives, tape drives, etc). These computers 102, 106 and direct-attached storage devices 112 may communicate using protocols such as ATA, SATA, SCSI, SAS, Fibre Channel, or the like. Any or all of the computers 102, 106 may utilize the caching system described herein to access data from the storage devices 112.

The computer-network architecture 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as individual hard disk drives 110a or solid state drives 110a, arrays 110b of hard disk drives or solid-state drives, tape drives 110c, tape libraries 110d, CD-ROM libraries, or the like. Where the network 108 is a SAN, the servers 106 and storage systems 110 may communicate using a networking standard such as Fibre Channel (FC). Any or all of the computers 102, 106 may utilize the caching system described herein to store data retrieved from the storage devices 110.

Figure 2:
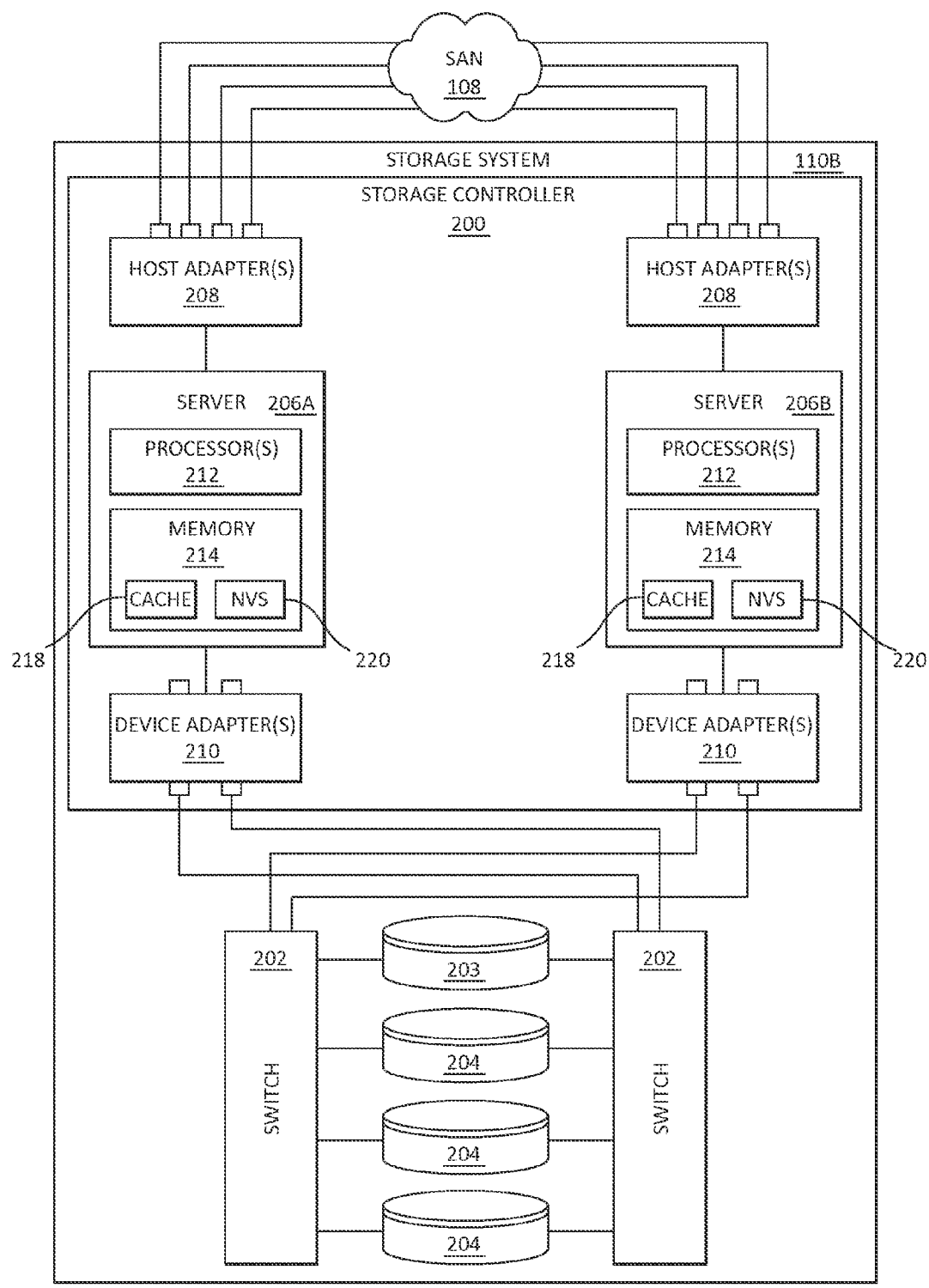
FIG. 2 is a high-level block diagram showing one example of a storage system where an apparatus and method in accordance with the invention may be implemented.

Referring to FIG. 2, one embodiment of a storage system 110b containing an array of hard-disk drives 204 and/or solid-state drives 203 is illustrated. The internal components of the storage system 110b are shown since the caching system may, in certain embodiments, be implemented within such a storage system 110b, although the caching system may also be applicable to other storage systems 110. As shown, the storage system 110b includes a storage controller 200, one or more switches 202, and one or more storage devices 203, 204, such as hard disk drives 204 or solid-state drives 203 (such as flash-memory-based drives 203). The storage controller 200 may enable one or more hosts 106 (e.g., open system and/or mainframe servers 106) to access data in the one or more storage devices 203, 204.

In selected embodiments, the storage controller 200 includes one or more servers 206. The storage controller 200 may also include host adapters 208 and device adapters 210 to connect the storage controller 200 to host devices 106 and storage devices 203, 204, respectively. Multiple servers 206a, 206b may provide redundancy to ensure that data is always available to connected hosts 106. Thus, when one server 206a fails, the other server 206b may remain functional to ensure that I/O is able to continue between the hosts 106 and the storage devices 203, 204. This process may be referred to as a "failover."

One example of a storage system 110b having an architecture similar to that illustrated in FIG. 2 is the IBM® DS8000™ enterprise storage system. The DS8000™ is a high-performance, high-capacity storage controller providing disk storage that is designed to support continuous operations. The DS8000™ series models may use IBM's POWER5™ servers 206a, 206b, which may be integrated with IBM's virtualization engine technology. Nevertheless, the caching system disclosed herein is not limited to the IBM® DS8000™ enterprise storage system 110b, but may be implemented in any comparable or analogous storage system 110, regardless of the manufacturer, product name, or components or component names associated with the system 110. Furthermore, any system that could benefit from one or more embodiments of the invention is deemed to fall within the scope of the invention. Thus, the IBM® DS8000™ is presented only by way of example and is not intended to be limiting.

In selected embodiments, each server 206 may include one or more processors 212 (e.g., n-way symmetric multiprocessors) and memory 214. The memory 214 may include volatile memory (e.g., RAM) as well as non-volatile memory (e.g., ROM, EPROM, EEPROM, hard disks, flash memory, etc.). The volatile memory and non-volatile memory may, in certain embodiments, store software modules that run on the processor(s) 212 and are used to access data in the storage devices 203, 204. The servers 206 may host at least one instance of these software modules. These software modules may manage all read and write requests to logical volumes in the storage devices 203, 204.

In selected embodiments, the memory 214 may include a cache 218. Whenever a host 106 (e.g., an open system or mainframe server 106) performs a read operation, the server 206 that performs the read may fetch data from the storages devices 203, 204 and save it in its cache 218 in the event it is required again. If the data is requested again by a host 106, the server 206 may fetch the data from the cache 218 instead of fetching it from the storage devices 203, 204, saving both time and resources. Similarly, when a host 106 performs a write, the server 106 that receives the write request may store the write in its cache 218, and destage the write to the storage devices 203, 204 at a later time. When a write is stored in cache 218, the write may also be stored in non-volatile storage (NVS) 220 of the opposite server 206 so that the write can be recovered by the opposite server 206 in the event the first server 206 fails.

Figure 3:
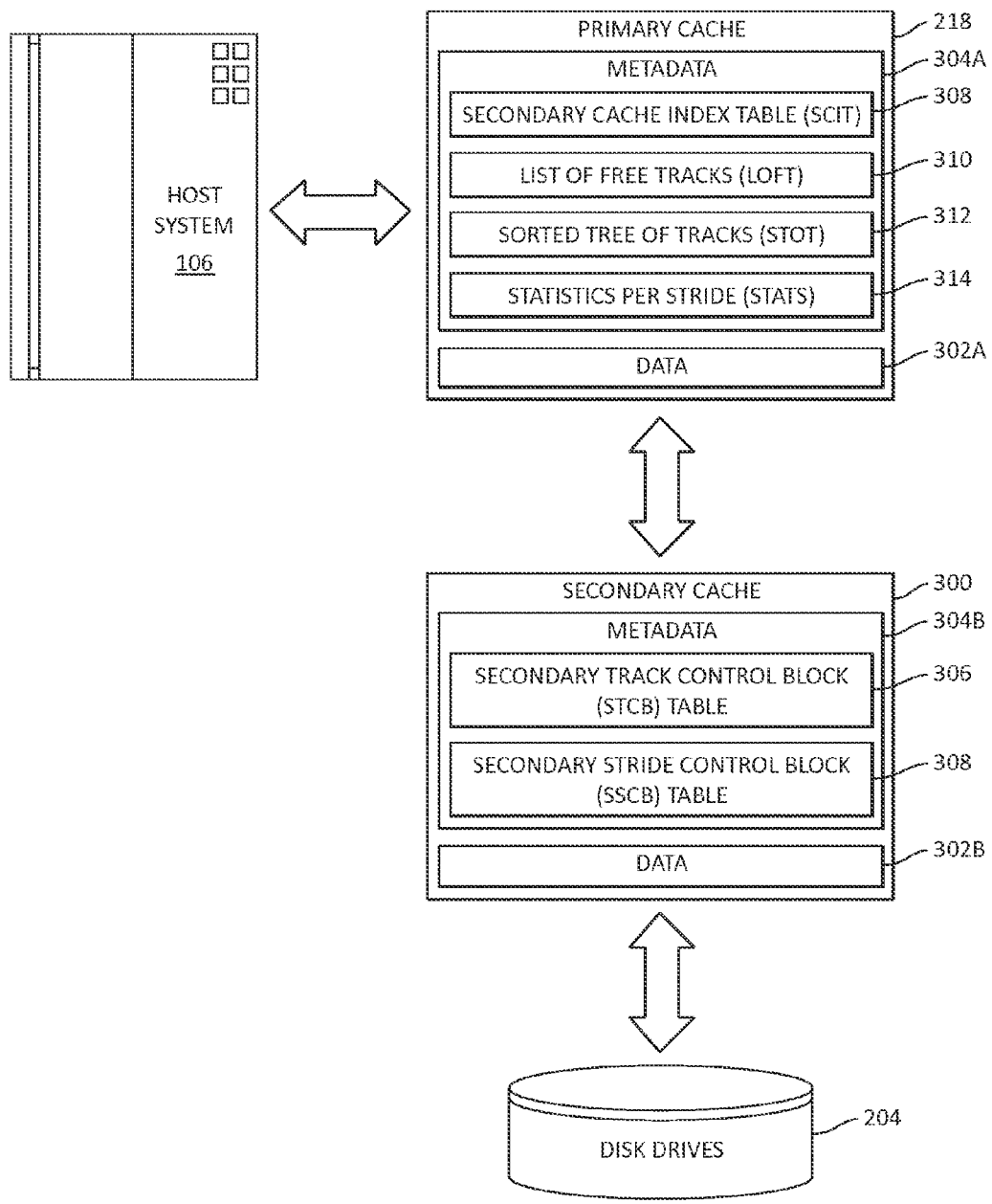
FIG. 3 is a high-level block diagram showing one embodiment of a multi-level cache in accordance with the invention.

Referring to FIG. 3, while continuing to refer generally to FIG. 2, as previously mentioned, a storage system 110b may include both hard disk drives 204 and solid-state drives (SSDs) 203, such as flash-memory-based drives 203. The I/O performance of SSDs 203 or other types of solid-state memory is typically far higher than the I/O performance of hard disk drives 204. Because of the higher I/O performance, the solid-state drives 203 may, in certain embodiments, be used to provide a large secondary cache 300 between the primary cache 218 and the hard disk drives 204. This large secondary cache 300 may significantly improve the I/O performance of the storage system 110 b, and may be referred to herein as "Flash Cache."

Using the secondary cache 300, if a read request is received by a server 106, the server 106 may initially look for data in the primary cache 218 and, if the data is not present, look for the data in the secondary cache 300 (residing in the solid-state drives 203). If the data is not available in either cache, the server 106 may retrieve the data from the disk drives 204. Similarly, when writing data, a server 106 may initially write the modified data to the primary cache 218. This modified data may eventually be destaged to the secondary cache 300 to make room in the primary cache 218. This data may then be destaged to the disk drives 204 to make space in the secondary cache 300, as needed.

In certain embodiments, the secondary cache 300 may be sized to provide about one to twenty percent, or in other embodiments about five percent of the total storage capacity of the storage system 110b. Thus, for a storage system 110 b that contains about ten terabytes (TB) of storage (from both hard disk drives 204 and solid state drives 203), about 0.5 TB of this storage space may be used as a secondary cache 300. Such a large amount of secondary cache 300 may allow data to be destaged from the secondary cache 300 far less frequently than conventional primary or secondary caches. As an example, a very large secondary cache 300 could store writes for an entire day without having to destage the writes to the disk drives 204. The writes could then be destaged at night or during a period of relative inactivity. Cache management algorithms may be redesigned to efficiently utilize the additional space in the secondary cache 300 and take advantage of the performance improvements that are possible using a large secondary cache 300.

As shown in FIG. 3, each cache 218, 300 may store data 302a, 302b and metadata 304a, 304b. As will be shown in FIG. 4, the data 302a, 302b may be stored in the form of tracks. Each track in the secondary cache 300 may have a secondary track control block (STCB) associated therewith. The STCB may also be referred to herein as Cache Flash Control Block (CFCB). Along with other information, the STCB for each track may include a pointer to the next track in the chain, information indicating whether the track is free or in-use, as well as information indicating which sectors in the track have been modified. In certain embodiments, the STCBs for all the tracks may be stored in an STCB table 306 stored in the secondary cache 300 as shown, or elsewhere.

In addition, each track in the secondary cache 300 may have a secondary stride control block (SSCB) associated therewith. The SSCB, like the STCB may include diagnostic and/or statistical information, but instead relating to strides (groups of tracks) stored in the secondary cache 300. The SSCB may also be referred to herein as Cache Flash Element (CFE). In certain embodiments, the SSCBs for all the strides may be stored in an SSCB table 308 stored in the secondary cache 300 as shown, or elsewhere.

Similarly, the primary cache 218 may also store metadata 304a associated with the secondary cache 300. For example, the primary cache 218 may store a secondary cache index table (SCIT) 308 that provides a directory for tracks in the secondary cache 300. In certain embodiments, the SCIT 308 is essentially a hash table with a constant hash function. To locate a specific track in the SCIT 308, the hash function may convert a track identifier (e.g., a track number) to a hash value. This hash value may then be looked up in the SCIT 308 to find the STCB for the track. Alternatively, the SCIT 308 could be incorporated into a cache directory of the primary cache 218, thereby providing a single hash table that stores tracks for both the primary and secondary caches 218, 300. In selected embodiments, the SCIT 308 is kept exclusively in the primary cache 218. The SCIT 308 may be built or rebuilt (in the event of a failover, failback, or initial microcode load (IML)) by reading the STCB table 306 in the secondary cache 300.

In certain embodiments, the primary cache 218 may also store a list of free tracks (LOFT) 310 that indicates which tracks in the secondary cache 300 are free (i.e., unoccupied). This list 310 may be used to locate free space in the secondary cache 300 in order to destage data from the primary cache 218 to the secondary cache 300. In selected embodiments, inserting or removing tracks from the LOFT 310 may be performed in a log structured manner. For example, tracks may be inserted at the end of the LOFT 310 and deleted from the front of the LOFT 310. The LOFT 310 may be kept exclusively in the primary cache 218 and may be built or rebuilt by reading the STCB table 306 in the secondary cache 300.

The primary cache 218 may also store a sorted tree of tracks (STOT) 312 that sorts the tracks by "trackid" or some other indicator. The STOT 312 may be used to minimize seek time (on the disk drives 204) when destaging tracks from the secondary cache 300 to the disk drives 204. The STOT 312 may be kept exclusively in the primary cache 218 and may be built or rebuilt by reading the STCB table 306 in the secondary cache 300.

The primary cache 218 may also store statistics per stride (STATS) 314 for each stride having one or more tracks in the secondary cache 300. A "stride" refers to a set of logically sequential data that might be segmented across multiple disks combined with additional parity information as is for example used in a RAID-5 (redundant array of inexpensive disks) configuration. In general, the STATS 314 may be used to determine which tracks require the least number of disk operations ("disk ops") to destage from the secondary cache 300 to the disk drives 204. In general, the destage penalty for a track will be less where more tracks are present in a stride. When selecting tracks to destage, tracks requiring the least number of disk ops may be destaged first to minimize resource utilization. In selected embodiments, the STATS 314 may store information such as the number of tracks that are present in the secondary cache 300 for each stride, and the number of disk ops required to destage a track in a stride. In certain embodiments, the STATS 314 may store a "recency" bit for each stride. The recency bit may be incremented each time an eviction process passes through a stride. The recency bit may be reset each time a track is added to a stride. The recency bit may be used to keep strides in the secondary cache 300 that are actively being written to. The STATS 314 may be kept exclusively in the primary cache 218 and may be built or rebuilt by reading the STCB table 306 in the secondary cache 300.

The metadata 304a, 304b described above may be structured and stored in various different ways and is not limited to the illustrated structure or organization. The metadata 304a, 304b is provided by way of example to show one technique for storing and structuring the metadata 304a, 304b. For example, in certain embodiments, the data and metadata may be stored together in the secondary cache 300 in a circular log-structured array. Other methods for structuring and storing metadata 304a, 304b may be used and are encompassed within the scope of the invention.

As previously mentioned, one advantage of a large secondary cache 300 is that data can be destaged from the secondary cache 300 far less frequently than conventional secondary caches. This may enable more data to accumulate in the secondary cache 300 before it is destaged to the disk drives 204. Accordingly, in selected embodiments, an apparatus and method in accordance with the invention may be configured to wait for full strides of data to accumulate and coalesce in the secondary cache 300 before the data is destaged to the disk drives 204. As explained above, this may minimize the number of disk ops required to destage data from the secondary cache 300 to the disk drives 204, thereby improving overall system performance.

Figure 4:
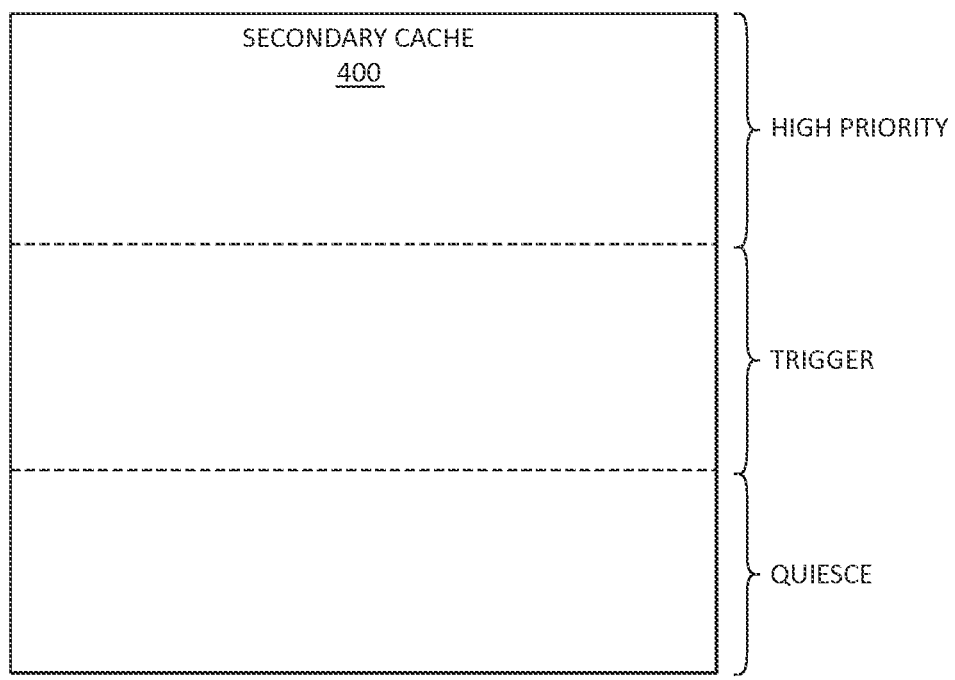
FIG. 4 is a high-level block diagram showing various levels or ranges that may be implemented within the secondary cache.

Referring to FIG. 4, in certain embodiments, evictions from the secondary cache 300 may be performed based on occupancy. For example, three ranges may be defined in the secondary cache 300: (1) quiesce; (2) trigger; and (3) high priority. When the occupancy of the secondary cache 300 is in the quiesce range (e.g., the secondary cache 300 is between zero and fifty percent full), no data may be evicted from the cache 300. Similarly, when the cache occupancy is in the trigger range (e.g., the secondary cache 300 is between fifty and seventy percent full), cache evictions may be performed in a normal mode until the cache occupancy is within the quiesce range. Similarly, when the cache occupancy is in a high priority range (e.g., the secondary cache 300 is greater than seventy percent full), cache evictions may be performed in a high priority mode until the cache occupancy is back in the trigger range. The numeric ranges provided above are presented only by way of example and are not intended to be limiting. Regardless of the eviction mode, the eviction process may destage tracks requiring the least number of disk ops to destage.

As previously mentioned, challenges may arise due to writing partial (incomplete) data segments to the secondary cache, including wasting valuable memory space and incurring additional I/O operations. The mechanisms of the present invention serve to address these challenges by implementing various strategies for more efficient promotion of partial data segments to the secondary cache. Among these strategies are the following possible embodiments, as will be further described. In a first embodiment, the partial data segments, or tracks, are written as whole tracks (having holes or missing data) on the secondary cache. In a second embodiment, the partial tracks are densely packed in one or more Cache Flash Elements (CFEs). In a third possible embodiment, various portions, or pages, of the tracks are scattered among segments of the secondary cache as room is located.

Figure 5:
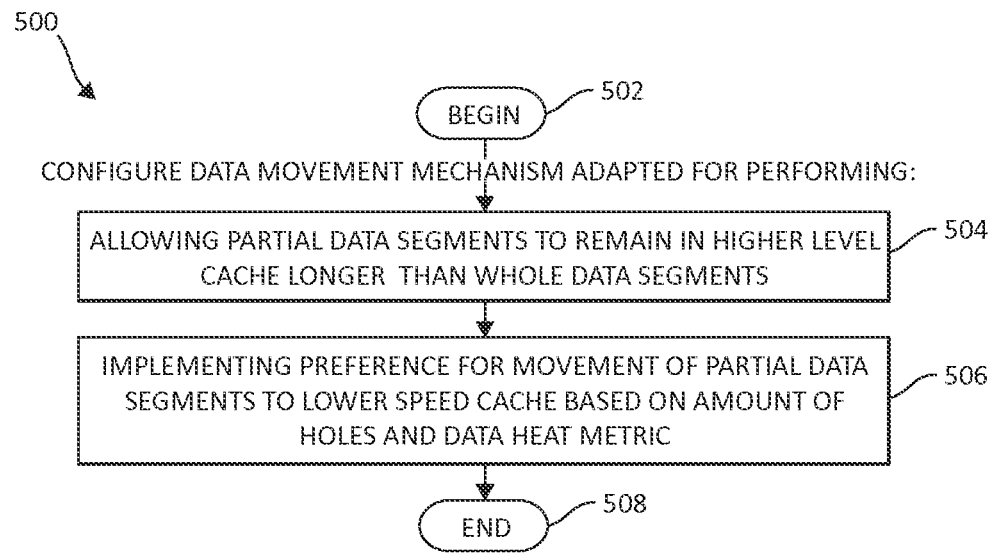
FIG. 5 is a flowchart illustrating an exemplary method for efficient promotion of partial data segments in accordance with one embodiment.

Turning first, however, to FIG. 5, a first exemplary method for promoting partial data segments in secondary cache (Flash Cache), in a computing environment having dual lower and higher speed levels of cache, is illustrated. In the illustrated embodiment, the secondary cache is represented as the lower speed level of cache, and the higher speed cache may be implemented in the storage controller as DRAM cache as in a previous exemplary illustration. Method 500 begins (step 502) as a data movement mechanism is configured. The data movement mechanism is adapted for, first, allowing partial data segments to remain in the higher level of cache longer than whole data segments (step 504). In other words, the data movement mechanism implements operations with a built-in preference for moving whole data segments to the Flash Cache than the partial data segments, in the hope that the holes in the partial data segments will be filled.

The data movement mechanism is further adapted for implementing a preference of data movement of the partial data segments to the lower speed cache (again, e.g., Flash Cache) based on several metrics. Two possible such metrics are the amount of holes and data "hotness," or a data heat metric (step 506). These metrics will be further described in an example situation, following. One objective of the preference of data movement previously described is to free up more space in the higher speed cache with a subsequent destage operation (more data being destaged) and coalesce into a single write to the secondary, lower speed cache. The method 500 then ends (step 508).

Figure 6:
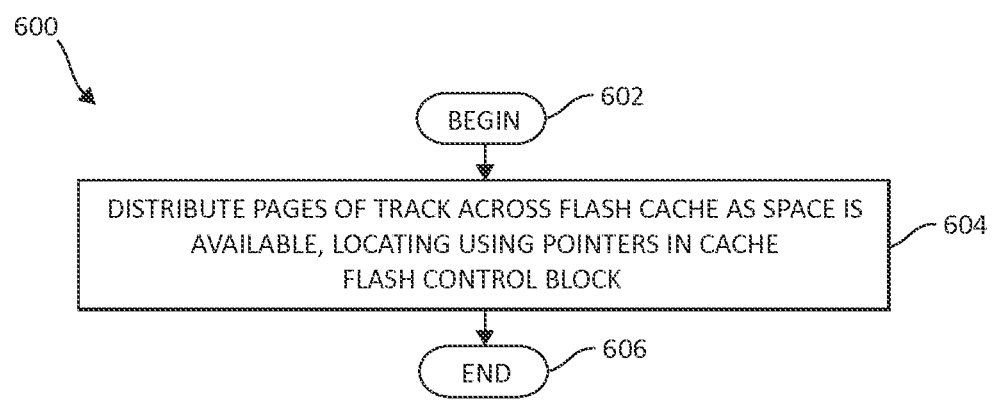
FIG. 6 is a flowchart illustrating an additional embodiment for efficient promotion of partial data segments.

As previously described, one possible embodiment of a data movement mechanism as illustrated in FIG. 5, previously, is writing the partial data segments across portions of the secondary cache as room is available. To locate the scattered data, pointers in the Cache Flash Control Block (again, CFCB) may be utilized. FIG. 6, following, illustrates such a mechanism as shown by method 600, which begins (step 602) by distributing pages of a track across Flash Cache as space is available, locating such pages using pointers in one or more CFCBs (step 604). The method 600 then ends (step 606). Benefits of the foregoing embodiment include reducing and/or elimination of valuable storage space in the secondary cache, and requiring no additional I/O operations.

Figure 7:
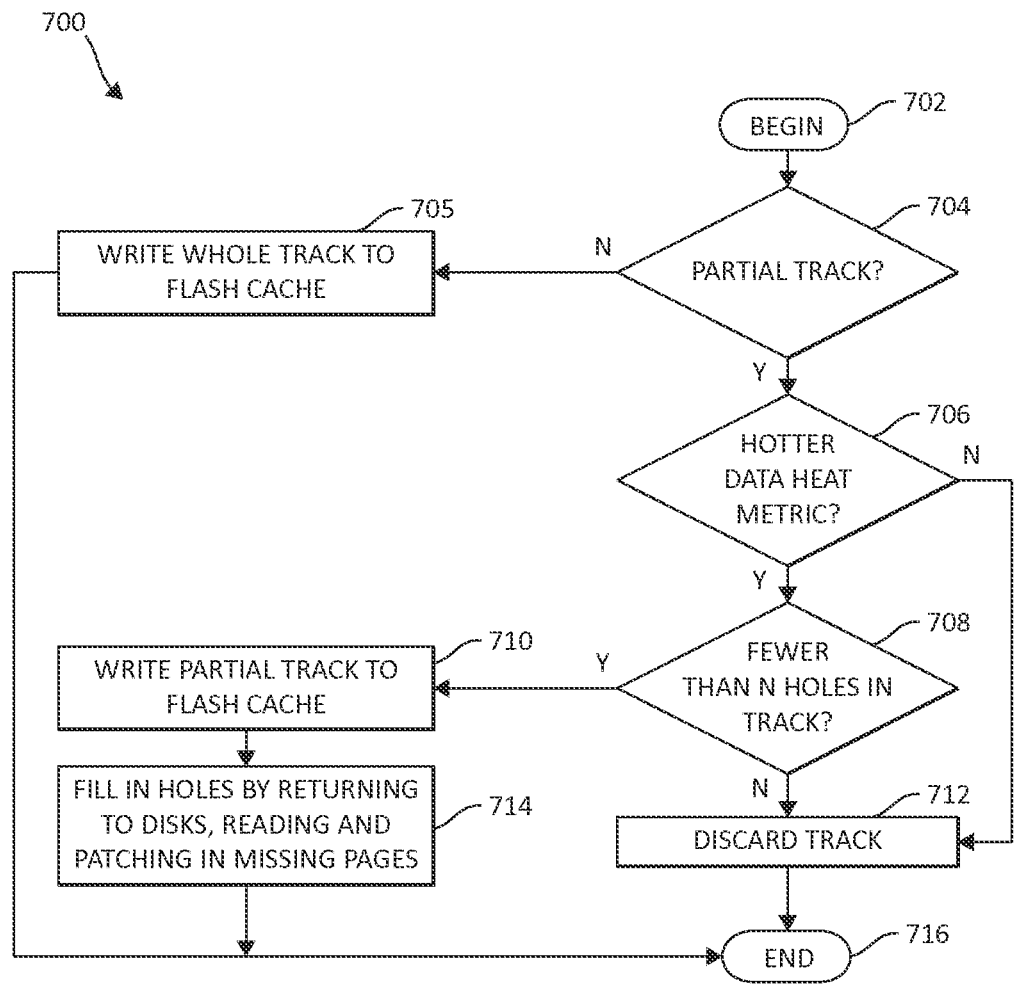
FIG. 7 is a flowchart illustrating an additional embodiment for efficient promotion of partial data segments.

An additional possible implementation of a data movement mechanism involves the write of the partial track(s) as whole tracks (including the data holes) on the secondary cache, subject to various factors. FIG. 7, following, illustrates such a data movement mechanism embodied as method 700. Method 700 begins (step 702) with the determination of whether the data segment in question is a partial track (step 704). If no, the method 700 moves to step 705, where the whole track is written to the flash cache. The method 700 then ends (step 716). The method 700 queries whether the partial track exhibits a "hotter" data heat metric (in other words, is the data used more frequently in comparison to other data). If so, the method 700 moves to step 708, where the method 700 queries whether the partial data segment in question has less than a predetermined "N" number of holes. If yes, the method moves to step 710, where the partial data segment is written to the secondary cache (step 710). In an alternative embodiment, the size of the hole(s) may be weighed in a decision to write the partial data segment in similar fashion.

Returning to step 706, if the data segment does not exhibit a hotter data heat metric, and there are not fewer than N holes, the method 700 moves to step 712, wherein the partial data segment is discarded. The method 700 then ends (again, step 716). Returning to step 710, and as may be implemented in an optional embodiment, the method 700 then returns to the backing storage to read and patch the missing portions of the partial data segment (step 714). The method then ends (again, step 716). Using the foregoing exemplary mechanisms illustrated in FIG. 7 allow the partial data segments to remain longer in the higher speed cache level (e.g., DRAM cache) than whole data segments. As one of ordinary skill in the art will appreciate, the predetermined number N and/or size of hole(s) may be varied according to a particular implementation.

Figure 8:
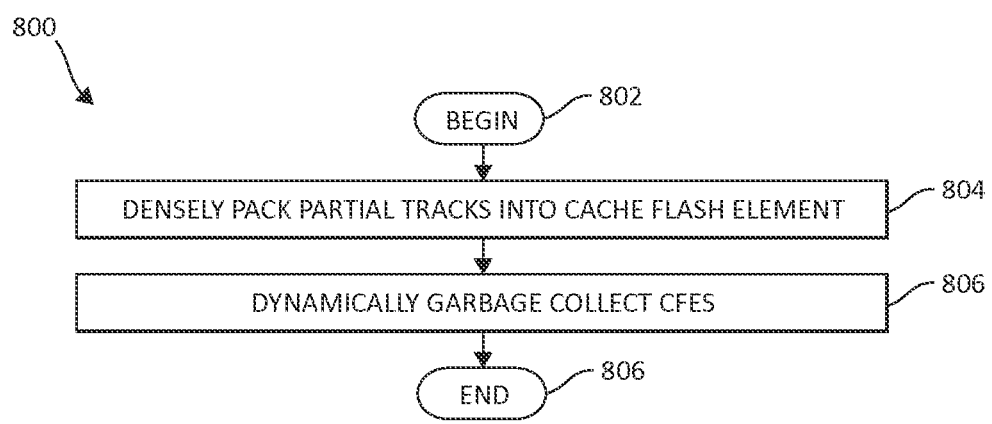
FIG. 8 is a flowchart illustrating a further additional embodiment for efficient promotion of partial data segments.

An additional possible embodiment for implementing a data movement mechanism according to the illustration shown previously in FIG. 5 involves densely packing the partial data segments into one or more Cache Flash Elements (CFEs) as previously described. Turning now to FIG. 8, an exemplary method 800 for performing such an operation is illustrated, and begins (step 802) by densely packing the partial tracks (i.e., removing the holes therebetween) into the CFE(s) (step 804). In a subsequent step, the CFEs may be then dynamically garbage collected (step 806). In other words, portions of data in one or more CFEs, subsequent to the packing step, may be designated as garbage and reclaimed. The method 800 then ends (step 808). In other embodiments, since additional secondary cache space may be needed to implement garbage collection mechanisms, an alternative mechanism may be implemented which does not reclaim the data segments from the CFEs. In other words, all of the associated data segments may be evicted at once.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagram in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for promoting partial data segments in a computing storage environment having lower and higher speed levels of cache by a processor, comprising:
  configuring a data moving mechanism adapted for performing:
    implementing a preference for movement of the partial data segments to the lower speed cache level based on at least one of an amount of holes and a data heat metric, wherein:
      a first of the partial data segments having at least one of a lower amount of holes and a hotter data heat metric is moved to the lower speed cache level ahead of a second of the partial data segments having at least one of a higher amount of holes and a cooler data heat; and
      if the first of the partial data segments has a hotter data heat metric and greater than a predetermined number of holes, the first of the partial data segments is discarded.

2. The method of claim 1, further including, pursuant to configuring the data mover mechanism, allowing the partial data segments to remain in the higher speed cache level for a time period longer that at least one whole data segment.

3. The method of claim 1, further including, pursuant to configuring the data mover mechanism, writing one of the partial data segments to the lower speed cache level as a whole data segment.

4. The method of claim 1, further including, pursuant to configuring the data mover mechanism, densely packing one of the partial data segments into a Cache Flash Element (CFE).

5. The method of claim 1, further including writing fixed portions of the partial data segment to portions of the lower speed cache corresponding to an associated storage device, wherein the fixed portions are located using pointers in an affiliated Cache Flash Control Block (CFCB).

6. The method of claim 2, further including reading data from a backing storage corresponding to missing data from the one of the partial data segments to patch the missing data with the read data.

7. The method of claim 6, wherein a decision to perform the reading and patching the data is based on at least one of the amount of holes, the data heat metric, and a size of at least one of the holes.

8. The method of claim 3, further including performing, pursuant to densely packing the one of the partial data segments, one of:
dynamically garbage collecting the CFE, and
abstaining from reclaiming data from the CFE.

9. A system for promoting partial data segments in a computing storage environment having lower and higher speed levels of cache, comprising:
a processor, operable in the computing storage environment, wherein the processor is adapted for:
configuring a data moving mechanism adapted for performing:
implementing a preference for movement of the partial data segments to the lower speed cache level based on at least one of an amount of holes and a data heat metric, wherein:
a first of the partial data segments having at least one of a lower amount of holes and a hotter data heat metric is moved to the lower speed cache level ahead of a second of the partial data segments having at least one of a higher amount of holes and a cooler data heat, and
if the first of the partial data segments has a hotter data heat metric and greater than a predetermined number of holes, the first of the partial data segments is discarded.

10. The system of claim 9, wherein the processor is further adapted for, pursuant to configuring the data mover mechanism, allowing the partial data segments to remain in the higher speed cache level for a time period longer that at least one whole data segment.

11. The system of claim 9, wherein the processor is further adapted for, pursuant to configuring the data mover mechanism, writing one of the partial data segments to the lower speed cache level as a whole data segment.

12. The system of claim 9, wherein the processor is further adapted for, pursuant to configuring the data mover mechanism, densely packing one of the partial data segments into a Cache Flash Element (CFE).

13. The system of claim 9, wherein the processor is further adapted for writing fixed portions of the partial data segment to portions of the lower speed cache corresponding to an associated storage device, wherein the fixed portions are located using pointers in an affiliated Cache Flash Control Block (CFCB).

14. The system of claim 10, wherein the processor is further adapted for reading data from a backing storage corresponding to missing data from the one of the partial data segments to patch the missing data with the read data.

15. The system of claim 14, wherein a decision to perform the reading and patching the data is based on at least one of the amount of holes, the data heat metric, and a size of at least one of the holes.

16. The system of claim 11, wherein the processor is further adapted for performing, pursuant to densely packing the one of the partial data segments, one of:
dynamically garbage collecting the CFE, and
abstaining from reclaiming data from the CFE.

17. A computer program product for promoting partial data segments in a computing storage environment having lower and higher speed levels of cache by a processor, the computer program product comprising a non-transitory computer-readable storage medium having computer-readable program code portions stored therein, the computer-readable program code portions comprising:
a first executable portion for configuring a data moving mechanism adapted for performing:
implementing a preference for movement of the partial data segments to the lower speed cache level based on at least one of an amount of holes and a data heat metric, wherein:
a first of the partial data segments having at least one of a lower amount of holes and a hotter data heat metric is moved to the lower speed cache level ahead of a second of the partial data segments having at least one of a higher amount of holes and a cooler data heat, and
if the first of the partial data segments has a hotter data heat metric and greater than a predetermined number of holes, the first of the partial data segments is discarded.

18. The computer program product of claim 17, further including a second executable portion for, pursuant to configuring the data mover mechanism, allowing the partial data segments to remain in the higher speed cache level for a time period longer that at least one whole data segment.

19. The computer program product of claim 17, further including a second executable portion for, pursuant to configuring the data mover mechanism, writing one of the partial data segments to the lower speed cache level as a whole data segment.

20. The computer program product of claim 17, further including a second executable portion for, pursuant to configuring the data mover mechanism, densely packing one of the partial data segments into a Cache Flash Element (CFE).

21. The computer program product of claim 17, further including a second executable portion for writing fixed portions of the partial data segment to portions of the lower speed cache corresponding to an associated storage device, wherein the fixed portions are located using pointers in an affiliated Cache Flash Control Block (CFCB).

22. The computer program product of claim 18, further including a third executable portion for reading data from a backing storage corresponding to missing data from the one of the partial data segments to patch the missing data with the read data.

23. The computer program product of claim 22, wherein a decision to perform the reading and patching the data is based on at least one of the amount of holes, the data heat metric, and a size of at least one of the holes.

24. The computer program product of claim 19, further including a third executable portion for performing, pursuant to densely packing the one of the partial data segments, one of:
dynamically garbage collecting the CFE, and
abstaining from reclaiming data from the CFE.

* * * * *